(12) United States Patent
Montaigne et al.

(10) Patent No.: US 10,129,004 B2
(45) Date of Patent: Nov. 13, 2018

(54) METHOD FOR ALLOCATING RESOURCES AND SYSTEM IMPLEMENTING SAID METHOD

(71) Applicant: AIRBUS DS SAS, Elancourt (FR)

(72) Inventors: François Montaigne, Lille (FR); Jean-Christophe Schiel, Coigniéres (FR); Guy Philippe, Maurepas (FR); Eric Georgeaux, Montigny le Bretonneux (FR); Christophe Gruet, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 78 days.

(21) Appl. No.: 15/125,821

(22) PCT Filed: Mar. 13, 2015

(86) PCT No.: PCT/EP2015/055337
§ 371 (c)(1),
(2) Date: Sep. 13, 2016

(87) PCT Pub. No.: WO2015/136092
PCT Pub. Date: Sep. 17, 2015

(65) Prior Publication Data
US 2017/0012759 A1    Jan. 12, 2017

(30) Foreign Application Priority Data
Mar. 13, 2014   (FR) ..................................... 14 00607

(51) Int. Cl.
*H04W 24/04*   (2009.01)
*H04W 72/04*   (2009.01)
*H04L 5/00*    (2006.01)
*H04W 72/12*   (2009.01)

(52) U.S. Cl.
CPC .......... *H04L 5/0073* (2013.01); *H04L 5/0048* (2013.01); *H04W 72/0453* (2013.01);
(Continued)

(58) Field of Classification Search
None
See application file for complete search history.

(56) References Cited

U.S. PATENT DOCUMENTS

2011/0275397 A1* 11/2011 Guey .................... H04W 16/12
                                                    455/509
2013/0121186 A1*  5/2013 Vajapeyam ......... H04W 72/085
                                                    370/252

(Continued)

OTHER PUBLICATIONS

"3$^{rd}$ Generation Partnership Project; Technical Specification Group Radio Access Network; Evolved Universal Terrestrial Radio Access (E-UTRA); Physical channels and modulation (Release 12)," 3GPP Standard; 3GPP TS 36.211, vol. RAN WG1, No. V12.0.0, Dec. 2013, pp. 1-120, XP050729027.

(Continued)

*Primary Examiner* — Duc T Duong
(74) *Attorney, Agent, or Firm* — Pillsbury Winthrop Shaw Pittman LLP

(57) ABSTRACT

A method for allocating radio resources in a wide band radio communication network for uplink communications, the network including cells, each having a base station and terminals, the method including during connection of a first terminal to a first base station of a first cell: performing reference signal quality measurements, defined respectively for the terminals of the cells by each base station, analyzing the interference detected from the first terminal on the uplink communications from the terminals connected to the base stations, the analysis being carried out as a function of the reference signal quality measurements, by each base station, allocating radio resources by the first base station for an (Continued)

uplink communication from the first terminal, as a function of the analysis results on detection of interference from the first terminal on the uplink communications from the other terminals of the cells, the results coming from each cell.

10 Claims, 6 Drawing Sheets

(52) U.S. Cl.
CPC ....... *H04W 72/1268* (2013.01); *H04L 5/0035* (2013.01); *H04L 5/0044* (2013.01); *H04L 5/0051* (2013.01)

(56) References Cited

U.S. PATENT DOCUMENTS

| | | | |
|---|---|---|---|
| 2013/0231125 A1 | 9/2013 | Jeon et al. | |
| 2013/0308473 A1* | 11/2013 | Sun | H04W 36/30 370/252 |
| 2016/0044689 A1* | 2/2016 | Wen | H04J 11/0023 370/330 |
| 2016/0056909 A1* | 2/2016 | Yasukawa | H04J 11/005 370/329 |
| 2016/0094324 A1* | 3/2016 | Lee | H04L 5/0048 375/267 |
| 2016/0285602 A1* | 9/2016 | Fang | H04W 24/02 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP Standard; 3GPP TS 36.213, vol. RAN WG1, No. V12.0.0, Dec. 2013, pp. 1-186, XP050729032.

International Search Report as issued in International Patent Application No. PCT/EP2015/055337, dated Jul. 24, 2015.

Alcatel-Lucent Shanghai Bell et al., "Performance Evaluation of X2 Signalling Supporting UL eCoMP with NIB," 3rd Generation Partnership Project (3GPP) TSG RAN WG1 Meeting #75, Nov. 2013, XP050735501, retrieved from the Internet, URL: http://www.3gpp.org/ftp/Meetings_3GPP_SYNC/RAN/RAN1/Docs>. 5 pages.

Gruet, C., et al., "The LTE Evolution: Private Mobile Radio Networks," IEEE Vehicular Technology Mazagine, IEEE, vol. 8, No. 2, Jun. 2013, XP011513178, pp. 64-70.

* cited by examiner

METHOD FOR ALLOCATING RESOURCES AND SYSTEM IMPLEMENTING SAID METHOD

CROSS REFERENCE TO RELATED APPLICATIONS

This application is the U.S. National Stage of PCT/EP2015/055337, filed Mar. 13, 2015, which in turn claims priority to French Patent Application No. 1400607 filed Mar. 13, 2014, the entire contents of all applications are incorporated herein by reference in their entireties.

FIELD OF THE INVENTION

The present invention relates, in a general manner, to the allocation of radio resources for mobile terminals evolving in a wide band cellular radio communication network of LTE (Long Term Evolution) type. More particularly, the invention relates to a proactive method for allocating resources in the uplink sense taking into consideration in advance the possible interferences arising between mobile terminals of adjacent cells. The invention finds applications in PMR (Professional Mobile Radio) systems or in general public radio communication systems.

STATE OF THE PRIOR ART AND TECHNICAL PROBLEMS ENCOUNTERED

Cellular networks applying OFDM (Orthogonal Frequency Division Multiplexing) technology do not undergo interference between user terminals connected to a same cell. On the other hand inter-cell interferences are the main interferences which limit the capacity of the network and more particularly the performances of cell-edge terminals. In fact, during the deployment of a wide band network such as a PMR network of LTE type applying OFDM technology, the cells each comprising a base station share in a given frequency spectrum the same radio resources. Thus a cell-edge terminal connected to a first cell can by virtue of its uplink communications with the first cell interfere with the uplink communications of the terminals of a second neighbouring cell when the two cells have separately planned said uplink communications on the same radio resources.

Solutions exist today to pre-empt these inter-cell interferences.

A first solution consists in measuring in each cell the path loss, which corresponds to the attenuation of the signal transmitted by the base station and received by a mobile terminal. Thus the cell-edge terminals having determined a strong signal propagation attenuation are planned in specific blocks of resources of the cell. Thus collisions of these terminals with the terminals of neighbouring cells may be avoided.

A second method is based on the determination of an Overload Indicator (OI) from a comparison of the measurement of the total power of the inter-cell interferences received by the cell and a given interference threshold. This indicator OI is transmitted to the adjacent cells of which one of them is going to select the terminal in question that is connected to it and control directly the transmission power of the terminal.

These methods have the drawback of basing their management of inter-cell interference once the interference has been detected, which implies a signal already interfered with and thus which cannot properly transmit its communication. The objective of the invention is on the contrary to predict interference before it takes place and to manage radio resources as a function of this prediction in order to minimise, or even to avoid, from the start of the communication any inter-cell interference.

Furthermore these solutions do not make it possible to estimate in a precise manner the inter-cell interference undergone. In fact, according to the first known method, the cells do not recognise each other and do not exchange information on interferences of terminals coming from neighbouring cells. According to the second known method, the indicator OI only proposes three levels for the interference which are: low, moderate or high. Which is not precise enough to estimate the interference.

PRESENTATION OF THE INVENTION

The invention proposes a proactive manner from coordinated exchanges between a group of adjacent cells for detecting potentially interfering terminals and allocating as a function thereof radio resources for their uplink communication in order to minimise any inter-cell interference.

An objective of the invention is to overcome the drawbacks of the prior art by proposing a method for allocating radio resources in a wide band radio communication network for uplink communications, the network being formed of cells each comprising at least one base station and terminals. The method is characterised in that it includes the following steps, during a connection of a first terminal to a first base station of a first cell of a group of cells formed of the first cell and the cells adjacent thereto:

reference signal SRS quality measurements defined respectively for the terminals of the group of cells by each base station, an analysis of the interference detected from the first terminal on the uplink communications of the terminals connected to the base stations of the group of cells, the analysis being carried out as a function of reference signal SRS quality measurements, by each base station of the group of cells, an allocation of radio resources by the first base station for an uplink communication from the first terminal as a function of the results of the analysis of the interference detected from the first terminal on the uplink communications of the other terminals of the group of cells, the results coming from each cell of the group of cells.

This method has the advantage of detecting possible inter-cell interferences in uplink communication before the allocation of resources for other uplink communications.

Another objective of the invention consists in a reliable and precise detection of possible interferences between adjacent cells caused by their terminals thanks to reference signal quality measurements of the terminals of the group of cells. Each base station successively orders each terminal connected to said each base station, the transmission of a reference signal SRS defined for said each terminal according to a first transmission time sequence. And each base station successively receives a reference signal SRS defined for a terminal of the group of cells according to a second reception time sequence, the transmission time sequence and the reception time sequence functioning in a simultaneous manner.

Another objective of the invention consists, according to an embodiment, in making flexible the allocation of radio resources for the terminals of the set of cells of the network while minimising inter-cell interferences. The allocation of resources by the first base station for the first terminal includes the following steps:

a reception of a request to establish a communication including an identity of the first terminal, a reference to a communication service required and an information relative to the number of blocks of resources necessary to communicate, a determination of a total communication need cost for the group of cells formed of the first cell and the cells adjacent thereto as a function of priority values linked respectively to the identities of the terminals of the group of cells, service values linked respectively to services required by the terminals of the group of cells, and the numbers of blocks of resources required respectively by the terminals of the group of cells, a determination of a total usage cost of each block of resources of a frequency band used by the network for all the cells of the group of cells, as a function of the priority values respectively linked to the terminals of which the uplink communications can be interfered with by the first terminal and as a function of the priority values respectively linked to the services required by the terminals of which the uplink communications may be interfered with by the first terminal, a selection of the necessary number of blocks of resources required by the first terminal, each selected resource block having a minimum total usage cost, and an allocation of blocks of resources selected and validated, for the first terminal.

The subject matter of the invention is also a base station executing the steps of the method for allocating radio resources.

BRIEF DESCRIPTION OF THE FIGURES

The invention will be better understood on reading the description that follows and on examining the figures that accompany it. These are only given for illustrative purposes and in no way limit the invention. The figures show.

DESCRIPTION OF THE INVENTION

It should be noted at this point that the figures are not to scale.

The following embodiments are examples. Although the description refers to one or more embodiments, this does not necessarily signify that each reference concerns the same embodiment, or that the characteristic apply only to a single embodiment. Single characteristics of different embodiments may also be combined to provide other embodiments.

Figure 1:
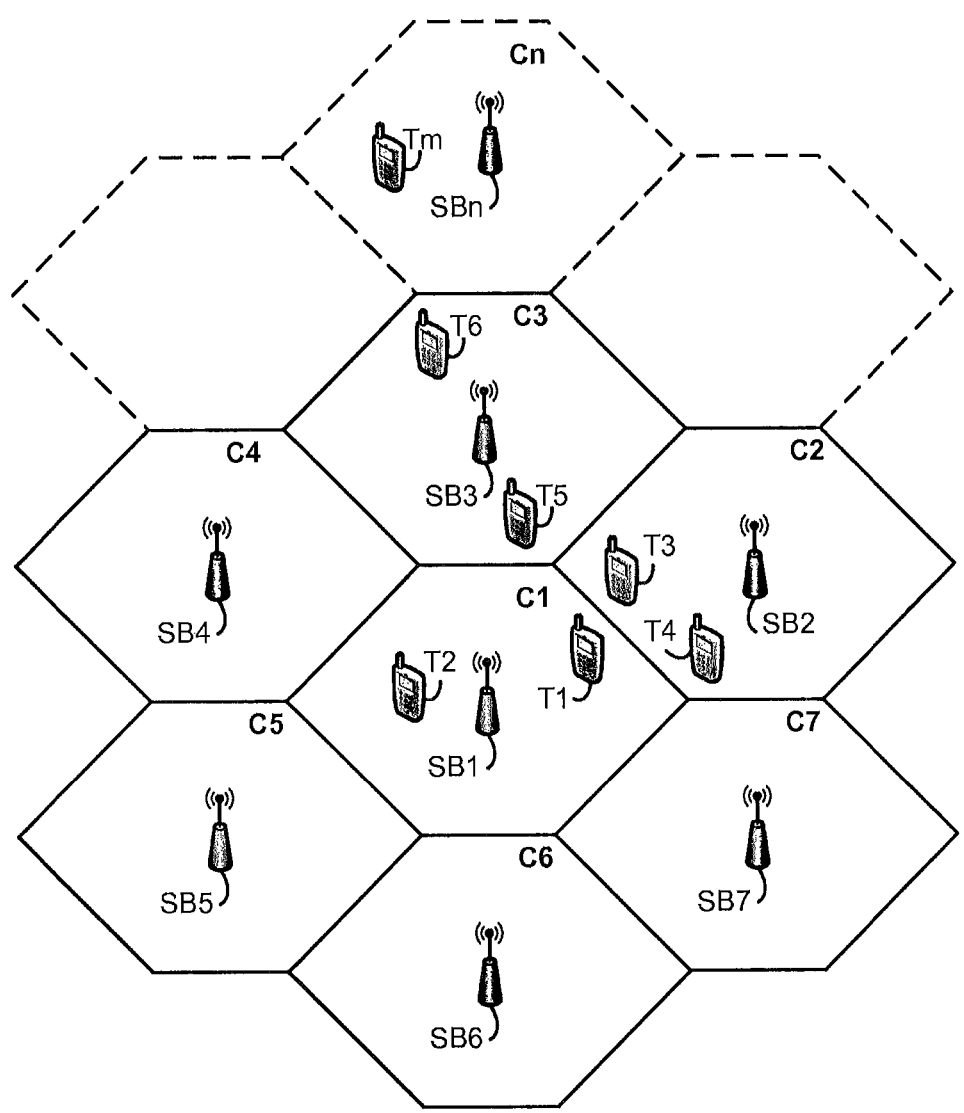
FIG. 1: a schematic representation of a radio communication system according to the invention.

FIG. 1 represents a radio communication system according to the invention. The radio communication system of the invention is a wide band radio communication network of LTE (Long Term Evolution) type which has available wide frequency bands each typically greater than a Mega-Hertz, for example 1.4 MHz, 3 MHz, 5 MHz, 10 MHz or 20 MHz.

The radio communication system includes cells Cn each comprising a base station SBn and terminals Tm connected to the base station, with the indices n and m whole numbers and $1 \leq n \leq N$, $1 \leq m \leq M$. Terminal Tm connected to the base station is taken to mean a terminal which has been registered with the base station to transmit to and to receive from the base station communications.

A base station SBn of a cell Cn is able to communicate with a terminal Tm of the cell Cn through a radio channel of the wide band radio communication network. A base station is also able to communicate with other base stations of the system through a wired channel, of X2 type according to the LTE standard. In LTE technology, the base station is called eNodeB.

Figure 2:
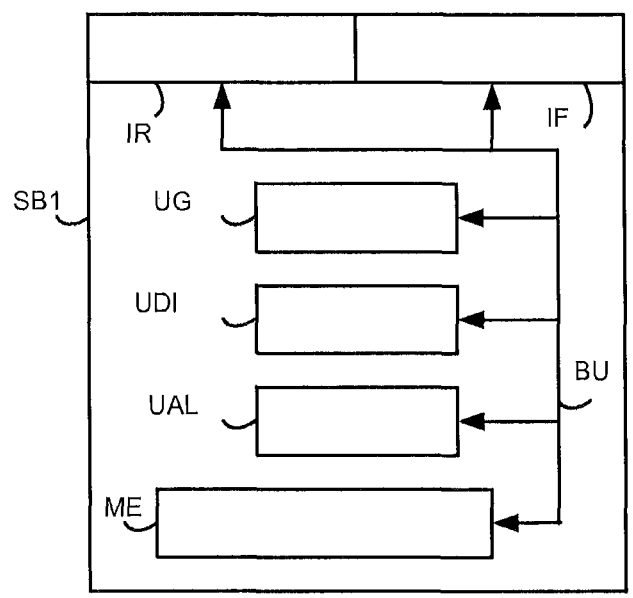
FIG. 2: a block diagram representative of a base station of the radio communication system according to the invention.

FIG. 2 represents, in more detail, a base station SBn according to the invention. The base station includes a radio communication interface IR, a wired communication interface IF, a station management unit UG, an interference detection unit UDI, a radio resources allocation unit UAL and a set of memories ME. The entities IR, IF, UG, UDI, UAL and ME are connected together by a two-directional bus BU.

The management unit UG comprises for example one or more processors defining the transmission rules of interference signals according to the method of the invention.

The interference detection unit UDI comprises for example one or more processors executing measurements and analyses of interferences detected according to the method of the invention.

The allocation unit UAL comprises for example one or more processors controlling the allocation of resources according to the method of the invention.

The radio communication interface IR transmits and receives messages, notifications from/to the terminals of the cell via radio communication channels.

The wired communication interface IF of X2 type according to the LTE standard transmits and receives messages, notifications from/to the adjacent base stations of the system SY.

The set of memories ME, also called memories ME, is a recording support in which programmes may be saved. It includes volatile and/or non-volatile memories such as EEPROM, ROM, PROM, RAM, DRAM, SRAM memories, etc. The algorithm implementing the steps of measuring and analysis of interference detected of the method according to the invention executed in the base station is memorised in the memories ME. Similarly, the algorithm implementing the steps of allocation of radio resources of the method according to the invention executed in the base station is memorised in the memories ME.

With reference to FIG. 1, a terminal Tm may be for example a telephone (smartphone), a tablet, a USB keymodem or any other type of fixed or mobile equipment (GPS, computer, video screen, etc.). A terminal Tm is able to communicate with a base station BSn to which it is connected through the wide band radio communication network.

Figure 3:
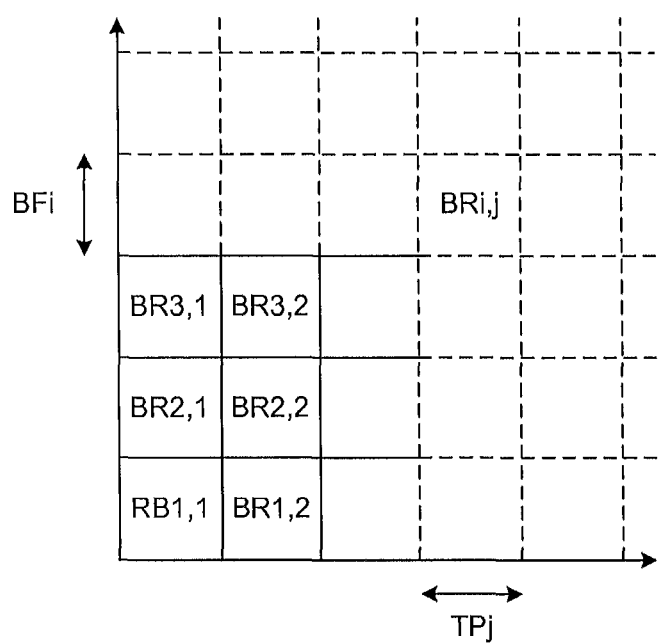
FIG. 3: a diagram representative of blocks of radio resources allocated or to be allocated.

The terminals of a same cell communicate with the base station of the cell via radio communication channels. In wide band technology, a radio communication channel is formed of one or more radio resource blocks. With reference to FIG. 3, radio resource blocks, also called radio blocks $BR_{i,j}$, is taken to mean a frequency block BR constituted of several frequency sub-carriers during a time window $TP_j$, called time step. The time window is constituted of several symbol times in the sense of OFDM modulation.

The communication channels allocated to a cell are divided into two types of communication channels: uplink communication channels and downlink communication channels. An uplink communication channel enables a communication from a terminal of the cell to the base station. A downlink communication channel enables a communication from the base station to a terminal or a group of terminals of the cell. The uplink and downlink communication channels in LTE type networks are separated according to FDD (Frequency Division Duplex) technology according to which the frequency spectrum is divided into two frequency bands shifted by a duplex gap. A first frequency band is dedicated to uplink communications and a second frequency band is dedicated to downlink communications. In the remainder of the description, a focus will quite particularly be made on uplink communication channels.

The uplink communication channels, each formed by one or more blocks of resources, include control channels and transport channels. The control channels include control data which are for example synchronisation data between a terminal and the base station, system information data, resource allocation data. The uplink communication control channels are accessible by the base station. The transport channels enable the transport of signalisation data such as the identity of the recipient, the modulation of the communication, and the transport of traffic data, such as voice data, multimedia data. Uplink communication transport channels are selected and allocated by the base station as a function of the communication demands sent by the transmitting terminals. The traffic data of the transport channels are only accessible to one or more specific terminals forming for example a communication group.

To establish an uplink communication between a terminal of the cell and the base station, the UAL unit of the base station allocates, according to the method of the invention, an uplink transport channel.

Figure 4:
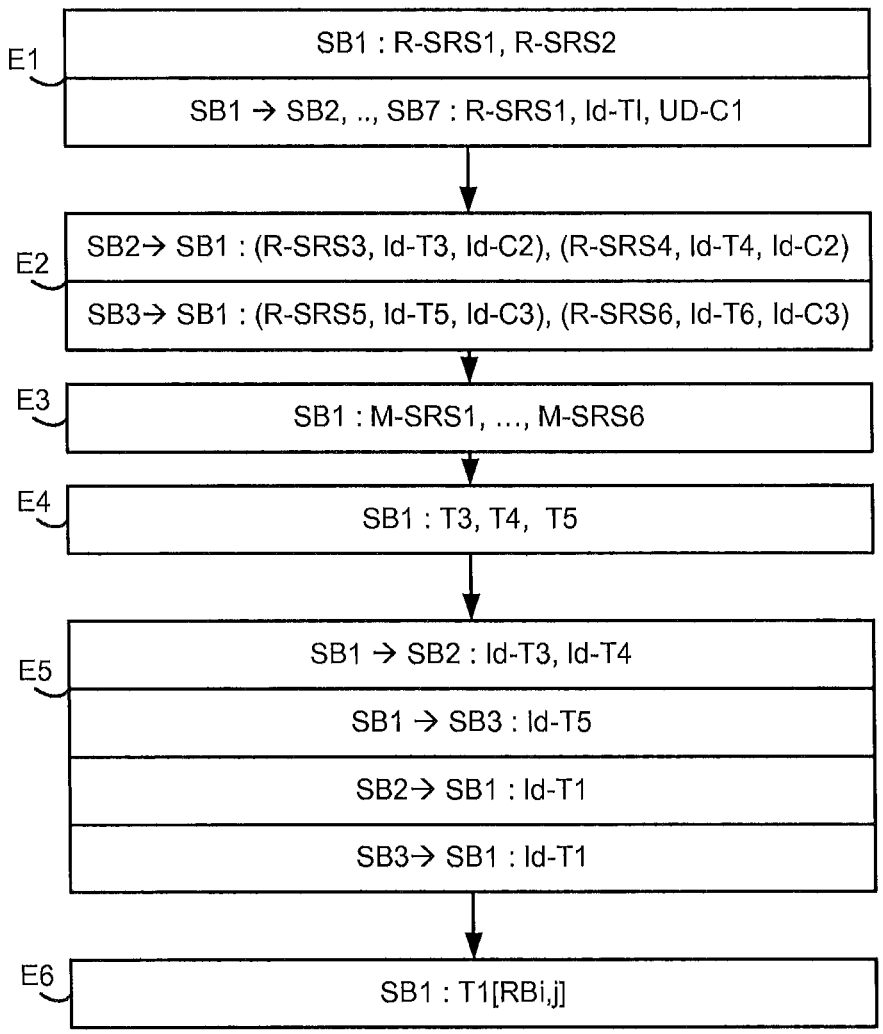
FIG. 4: a functional diagram of a method for allocating radio resources according to the invention.

With reference to FIG. 4, the method for allocating radio resources in the uplink sense includes essentially in each cell of the network:
  a step E3 of measurements of interference from the terminals of the cell and the terminals of the adjacent cells on uplink control channels respectively defined for each of said terminals, and
  a step E6 of specific allocation of uplink resources for the terminals as a function of these interference measurements to minimise inter-cell interferences between the terminals of adjacent cells.

The method according to the invention is based on a measurement of the reference signal for estimating SRS (sounding reference signals) transmitted by each terminal to a base station on a physical uplink channel in the 3GPP LTE standard, called sounding channel SRS. The sounding channel is a shared control channel such as the PUSCH (Physical Uplink Shared Channel) according to the LTE standard. A conventional use of a signal SRS transmitted by each terminal of a cell on the sounding channel is to enable said cell to estimate the quality of the spectrum in the uplink sense for each terminal of the cell and to allocate for each of the terminals the radio resources the least interfered with in the spectrum. The estimation may be made on part of the spectrum, for example on four radio blocks, or on the totality of the spectrum, that is to say on all the radio blocks. A signal SRS defined for a given terminal by the base station of the cell may be transmitted in a single time over the spectrum band or divided into sequences transmitted at different times on separate parts of the spectrum band. The transmission of the signal SRS takes place during the duration of a symbol and is applied systematically on the final symbol of a sub-fame of the sounding channel. Their transmission occurrence may be periodical or aperiodical between 2 ms and 320 ms.

The conventional estimation of signals SRS by a base station uniquely refers to the terminals of the cell without taking into consideration possible interferences from the terminals of the adjacent cells.

The method of the invention proposes a proactive estimation by each base station of the network, the signals SRS of the terminals of the cell and the adjacent cells. Proactive estimation is taken to mean an estimation made on a shared control channel (the sounding channel) and which enables a detection of intra-cell and inter-cell interferences upstream of the allocation of uplink resources for the terminals of a cell. This estimation is then used during the step of allocation of uplink resources to minimise intra-cell and inter-cell interferences.

FIG. 4 represents the steps of the method for allocating uplink radio resources in a cell. In the remainder of the description, reference will be made more particularly to the cell C1 of FIG. 1 by considering that the other cells operate in an identical manner. The method includes exchanges of information between the cell C1 and the cells adjacent thereto via X2 type channels according to the LTE standard. The base station SB1 selects and allocates itself the radio resources of the terminals which are connected to the base station SB1 of the cell C1 as a function, among other things, of the information items received from the adjacent cells. Cells adjacent to C1 is taken to mean, according to FIG. 1, cells C2 to C7. The adjacent cells of each cell are different from one cell to the other. The example of FIG. 1 represents a configuration of a group of seven adjacent cells from a central cell. This configuration may be more or less large.

At step E1, during the connection of a terminal, for example the terminal T1 to the base station SB1, the management unit UG of the base station defines rules R-SRS1 for transmission of a signal SRS dedicated to the terminal T1.

These rules include parameters which correspond to:
  the periodicity of the signal SRS which may be 2 ms to 320 ms,
  the number of sub-frames if the signal SRS is divided into sequences,
  the indices of the sequences forming the signal SRS, and
  the physical characteristics of the sequence SRS in terms of band width and frequency jump rules, such as here the choice of the frequency comb, the capacity to analyse the entire channel and whether there are or not frequency jumps.

The rules R-SRS1 enable the terminal T1 and the base station SB1 to identify the channel on which the terminal is going to transmit the reference signal SRS.

The rules R-SRS1 of the terminal T1 can be distinguished from the rules of the terminals of the cell C1, for example the rules R-SRS2 of the terminal T2. The signals SRS of the terminals of the cell C1 apply to the same frequency carriers but are defined such that they are orthogonal to each other in order not to interfere with each other and in order to be transmitted separately.

Once the rules R-SRS1 of the terminal T1 have been defined, they are transmitted to the terminal T1 via the radio interface IR of the base station. The rules R-SRS1 are also transmitted with an identity Id−T1 of the terminal T1 to the base stations SB2 to SB7 of the adjacent cells via the wired interface IF of the station SB1. Optionally, the rules R-SRS1 may be transmitted with the identity Id–T1 of the terminal T1 and the identity Id–C1 of the cell C1 to the base stations SB2 to SB7.

At step E2, the cell C1 may also receive one or more transmission rules defined for terminals that have just connected to a base station of one of the adjacent cells. For example, the unit IF of the station SB1 receives the rules R-SRS3 and R-SRS4 defined respectively for the terminals T3 and T4 of the cell C2 and the rules R-SRS5 and R-SRS6 defined respectively for the terminals T5 and T6 of the cell C3. The base station SB1 memorises the transmission rules defined or received as well as the identity of the associated terminal and the identity of the cell including said terminal. Thus the base station SB1 must have memorised in the memories ME all the transmission rules defined for all the terminals connected to the cell C1 and to the adjacent cells C2 to C7. In the memories ME, the rules are matched with the respective identity of the terminals and also with the respective identity of the cells including said terminals. Thus, according to the example of FIG. 1, the memories ME of the station SB1 must have in memory the following associations [SRS rules/terminal identity/cell identity]:

[R-SRS1/Id–T1/Id–C1] relative to terminal T1 of cell C1,
[R-SRS2/Id–T2/Id–C1] relative to terminal T2 of cell C1,
[R-SRS3/Id–T3/Id–C2] relative to terminal T3 of cell C2,
[R-SRS4/Id–T4/Id–C2] relative to terminal T4 of cell C2,
[R-SRS5/Id–T5/Id–C3] relative to terminal T5 of cell C3, and
[R-SRS6/Id–T6/Id–C3] relative to terminal T6 of cell C3.

At step E3, the interference detection unit UDI of the base station SB1 carries out the measurements M-SRS1 to M-SRS6 respectively of the signals SRS from the terminals of the cell C1 and the adjacent cells. The unit UDI can carry out the measurements on the basis of the transmission rules defined for the terminals of the cell C1 and the adjacent cells that are memorised in the memories ME. The measurement is an estimation of the quality of a signal SRS of a terminal. The measurement may be the power transmitted by each signal SRS or the SINR (Signal-to-Interference plus Noise Ratio) of said signal SRS.

At step E4, the unit UDI of the station SB1 analyses the possible inter-cell interferences as a function of the measurements carried out at step E3. Thus, to analyse the interference from each terminal of the cells C1 to C7 on the terminals of the cell C1, the base station SB1 determines the ratio of the measurement SRS of the terminal analysed on the measurement SRS of a terminal of the cell C1, the latter being distinct from the terminal analysed. Each ratio determined is compared with an interference threshold SI. If the ratio is greater than the given threshold then the terminal analysed is capable of interfering with the other terminal of the cell C1 if their uplink communication channels are later established in part in the same radio blocks. The interference threshold SI is determined as a function of an accepted reduction of throughput capacity due to interference compared to the case of non-interference.

With reference to FIG. 1, the unit UDI must analyse the signal SRS from T1 compared to the signal SRS from T2 and the signal SRS from T2 compared to the signal SRS from T1. Similarly, the UDI unit must analyse the signals SRS from the terminals T3 to T6 of the cells C2 and C3 as a function of the signals SRS from the terminals T1 and T2 of the cell C1. The terminals T1 and T2 are connected to the same cell C1 and are thus capable of mutually interfering with each other if their communication channels are later established in part on the same radio blocks. By analysing the interference of the signal SRS from the terminal T1, the ratio of the measurement M-SRS1 of the terminal T1 over the measurement M-SRS2 of the terminal T2 may then be greater than the threshold SI or conversely the ratio of the measurement M-SRS2 of the terminal T2 over the measurement M-SRS1 of the terminal T1 may then be greater than the threshold SI. At step E6, the uplink communication channel of T1 must thus be established on radio blocks different to those allocated for the uplink communication channel of the terminal T2.

According to another example, the terminals T1 and T4 are close to each other but connected to different cells, they are thus capable of interfering with each other if their communication channels are established in part on the same radio blocks. Thus during the analysis of the interference from the terminal T4 on the terminal T1, the ratio of the measurement M-SRS4 of the terminal T4 over the measurement M-SRS1 of the terminal T1 should be greater than the threshold SI. The same analysis is established for the terminals T3 and T5 respectively of the cells C2 and C3 which are capable of interfering with the uplink communications of the terminal T1 in the cell C1. On the contrary, the terminals T6 and T1 being quite far away in adjacent cells, the ratio of their measurement M-SRS6 over M-SRS1 carried out by the station SB1 should be less than the threshold SI. The terminal T6 is thus not capable of interfering with the uplink communications of the terminal T1, even if their uplink communications are established in part in the same radio blocks. Thus according to the example of FIG. 1, the detection unit UDI of the station SB1 detects the terminals T3, T4 and T5 of the adjacent cells as capable of interfering with the uplink communication of one of the terminals of the cell C1.

At step E5, the wired interface unit IF of the station SB1 that has analysed the interference from a terminal of an adjacent cell on the uplink communications established in the cell C1, transmits to the base station of the adjacent cell the results of the analysis including for example the identity of the terminal interfered with, the identity of the potentially interfering terminal and the measurements or values determined. In a variant, the unit IF of the station SB1 transmits to the base station of the adjacent cell the results of the analysis if the terminal of the adjacent cell is detected as interfering with a terminal of the cell C1.

According to the preceding example, the station SB1 transmits the identities Id–T3, Id–T4 of the interfering terminals T3, T4 to the base station SB2 of the cell C2 and the identity Id–T5 of the interfering terminal T5 to the base station SB3 of the cell C3.

Similarly, the base stations of the cells adjacent to the cell C1 transmit the results of the analysis of the interference from the terminal T1 on the uplink communications established for the terminals of the adjacent cells.

According to the preceding example, the base station SB2 transmits to the base station SB1 the identity Id–T1 of the interfering terminal T1 and the base station SB3 transmits to the base station SB1 the identity Id–T1 of the interfering terminal T1.

At step E6, the unit UAL of the base station SB1 allocates one or more radio blocks BRi,j to an uplink communication required by the terminal T1 as a function of the measurements that the unit UDI has carried out at steps E3 and E4 and the results transmitted by the cells C2 to C7. This allocation may be established according to two embodiments which will be described with reference in FIGS. 7 and 8.

The following sets of steps in each cell:
- steps E1 and E2, definition and transmission of the SRS rules,
- steps E3, E4 and E5, measurement of the signal SRS, detection of an interference, and transmission/reception of the results, and
- step E6 of allocation of radio resources for each terminal, are not executed immediately one following the other. In fact, their execution times differ from one set of steps to the other. The execution time of the measurements of the signals SRS may be longer than the execution time of an allocation of radio resource. In addition, the set of steps E1 and E2 are executed during a demand for connection of a terminal to the base station whereas the sets of steps E3 to E5 and E6 may be reiterated periodically. Moreover, the reiteration of the allocations of radio resources in the base station, at step E6, may be more frequent than the reiteration of the measurements SRS at step E3, the allocation then being determined from results memorised in the memories ME.

An embodiment of the SRS measurement carried out at step E3 is now described with reference to FIGS. 1, 5 and 6. This embodiment makes it possible to carry out precise and reliable measurements of signals SRS.

In a conventional manner, the rules R-SRS1 of a terminal T1 of a cell C1 can be distinguished from the rules R-SRS2, etc., of the other terminals T2, etc. of the same cell C1. The signals SRS of the terminals of a same cell apply to the same frequency carriers but are defined such that they are orthogonal to each other in order not to interfere with each other.

In fact, the signals SRS are transmitted in an FDMA (Frequency Division Multiple Access) interlaced mode according to a comb-shaped spectrum. The signal SRS applies to both carriers in the allocated sounding band. This enables two orthogonal transmissions at the same time with one terminal transmitting on the even sub-carriers and another terminal transmitting on the odd sub-carriers of the sounding band. In addition, each sub-carrier may be transmitted by application of the Zadoff-Chu sequence which enables a multiplexing of at most eight different terminals transmitting their signal SRS at the same time. Each Zadoff-Chu sequence includes two parameters, the cyclic shift parameter and the seed parameter. The first cyclic shift parameter makes it possible for each base station to discriminate the terminals which transmit their signal SRS at the same time. The second "seed" parameter also makes it possible for each base station to discriminate the cells including the terminals that transmit. Nevertheless, the use of two parameters does not seem sufficient to differentiate all the terminals transmitting simultaneously in a multi-cell environment. In fact, taking the example of FIG. 1, let us consider that the four terminals T1, T2, T3 and T5 of different adjacent cells are required by the base stations to transmit their signal SRS at the same time. The base station SB1 receives the four signals SRS at the same time. As a function of the two parameters for discriminating the Zadoff-Chu sequence, the terminals T1 and T2 connected to the cell C1 may be theoretically distinguished by means of their cycling offset parameter in the cell C1. The terminal T3 connected to the cell C2 may be distinguished from the other terminals by means of the frequency comb that it uses to transmit its signal SRS. The terminal T5 connected to the cell C3 and transmitting its signal SRS on the same frequency comb as the terminals T1 and T2 has only the "seed" parameter different to those of the terminals T1 and T2. In this case, it is difficult for the station SB1 to differentiate precisely the terminal T5 from the terminals T1 and T2 when they transmit their signal SRS simultaneously. The station SB1 cannot distinguish them in a reliable manner and thereby carry out a precise measurement.

To resolve this problem of discrimination of terminals in a multi-cell environment and thus in order to make the measurements of signals SRS reliable, the transmissions of the signals SRS from the terminals and their reception by each base station are scheduled according to two data time sequences. A first time sequence schedules for a group of adjacent cells the successive transmissions of signals SRS from the terminals of the group of cells. In the remainder of the description, this first sequence is called: transmission time sequence. A second time sequence schedules for a given cell the successive receptions of the signals SRS transmitted by the terminals of the cell or of the cells adjacent to said cell. The second sequence is hereafter called in the description: reception time sequence.

The transmission time sequence is applied to a given set of adjacent cells including a central cell and a first crown of cells adjacent to the central cell. According to the example of FIG. 5, the cells C1 to C7 form a transmission scheduling pattern of the signal SRS, with C1 the central cell and C2 to C7 the adjacent cells of the crown. This pattern is repeated in the entire network with for example C8, C15 and C22 of the central cells of a transmission scheduling pattern of the signal SRS. In FIG. 5 are represented in slanting lines the pattern formed of the cells C1 to C7, in dots the pattern formed of the cells C8 to C14 and in straight lines the pattern formed of the cells C15 to C21. The memories ME of the base stations of a set of cells forming a pattern includes the same transmission time sequence. This sequence defines the successive scheduling of transmissions of signals SRS in the set of cells and indicates at each given instant the identity of the cell of which the base station must command a transmission of a signal SRS to one of the terminals that is connected thereto. Thus according to the transmission time sequence a single terminal of the set of cells transmits both its signal SRS, which enables the base station of the cell which comprises the terminal and the base stations of the cells adjacent to said cell to measure said signal in a precise and reliable manner.

Thus to transmit a signal SRS, all the base stations of the pattern are synchronised by the transmission time sequence.

According to a first embodiment, the time sequence successively indicates to each base station to order successively all the terminals that are connected to it, the sending of their signal SRS. Then it is a second base station of the pattern that successively orders all the terminals that are connected to it, the sending of their signal SRS. And so on from base station to base station of the set of cells, until all of the terminals of the set of cells forming the pattern have transmitted their signal SRS. Then the sequence of transmission time reiterates at the first station.

According to a second embodiment, the transmission time sequence indicates at periodically given instants the scheduling of the transmission of a signal SRS from a terminal belonging successively to a different base station of the pattern. Once all of the base stations of the pattern have each ordered a transmission of a signal SRS from a terminal, the cycle reiterates and successively each base station of the pattern again orders a transmission of a signal SRS to another terminal that is connected to it. And so on until all the terminals of the set of cells have transmitted their signal SRS. Then the sequence is reiterated. This second embodiment is preferred since it enables a regular transmission for each cell of a signal SRS.

According to an example of the second embodiment relative to a transmission time sequence applied to the group of cells C1 to C7, the station SB1 of the cell C1 first orders an SRS transmission to one of the terminals that is connected to it, for example T1. Then, according to the sequence at the end of a transmission time of the signal SRS1, it is the base station SB2 of the cell C2 that orders one of the terminals that is connected to it to transmit its signal SRS, for example T4. And so on for all the cells C1 to C7 of the pattern up to reiteration of the transmission time sequence with the base station SB1 which orders the SRS transmission to another terminal of the cell C1, for example T2, and so on.

The transmission time sequences are applied in a similar manner respectively in each SRS transmission scheduling pattern formed by the set of adjacent cells. "In a similar manner" is taken to mean the fact that two nearby cells but belonging to different patterns cannot order the transmission of signals SRS at the same time. This makes it possible for each base station to only listen to one signal SRS at a time coming either from its cell or from neighbouring cells and avoids any conflict of distinction of signals SRS transmitted at the same time in nearby cells. For example, according to FIG. 5, the base station of the cell C2 of the pattern C1 to C7 and the base station of the cell C9 of the pattern C8 to C14 each order simultaneously an SRS transmission. Then it is the cells, C3 and C10, and the cells C11 and C4 and so on, so that two base stations of nearby cells such as C2 and C13 do not order an SRS transmission at the same time.

The memories ME of a base station of a cell include a reception time sequence of signals SRS distinct from the reception time sequences of the signals SRS of adjacent cells. In fact, each base station receives signals SRS coming from adjacent cells which are different from one cell to the other, these adjacent cells being able to belong to another signal SRS transmission pattern or step. Each cell of the system corresponds to a central cell of a scheduling pattern for reception as represented in the shaded area for the central cell C2 in FIG. 6. The reception time sequence of a signal SRS may be represented as a table indicating at each instant t which is the cell that orders a transmission of a signal SRS to a terminal being connected to it.

The reception time sequence of signals SRS applied to a cell is established in such a way that it must be synchronous with at least the transmission time sequence of signals SRS of the cell. In fact, the central cell of the transmission scheduling pattern and the reception scheduling pattern is the same and consequently the transmission time sequence and the reception time sequence are identical. Conversely, for a cell belonging to the crown of the transmission scheduling pattern, the reception time sequence must be synchronised with as many transmission time sequences as there are adjacent cells that belong to a different transmission scheduling pattern. For example, the reception scheduling pattern having for central cell the cell C2 covers three transmission scheduling patterns having for central cells the cells C1, C8 and C15. Thus the cell C2 has a reception time sequence synchronous with the transmission time sequence of the transmission scheduling pattern C1 to C7, the transmission scheduling pattern C8 to C13 and the transmission scheduling pattern C15 to C21. The reception time sequence specific to each base station enables it to know what cell is going to order the transmission of a signal SRS. This synchronisation of the reception sequence time on at least one transmission time sequence of the cell and of the cells adjacent to the cell avoids the base station of the cell from receiving several signals SRS at the same time.

The cycles of transmission time sequences and reception time sequences applied to the base stations of the system function simultaneously.

On reception, the cell can identify the terminal that transmits its signal SRS as a function of the Zadoff-Chu sequence which makes it possible to discriminate the terminal. In a variant, the cell that orders the transmission of the signal SRS can transmit to neighbouring cells the identity of the terminal that is going to transmit. In this latter case, each cell can be based on the signal SRS transmission rules in the memories ME associated with the identity of the terminal that is going to transmit to carry out their measurement.

Thus on receiving a signal SRS, the base stations do not need to identify the cell which comprises the terminal transmitting the signal.

According to the 3GPP TS 36.213 standard, a terminal periodically transmits its signal SRS between 2 ms to 320 ms. Thus a maximum of terminals in a given group of cells must all transmit successively their signals SRS in a maximum period of 320 ms. For example, in a given group of seven cells twenty two terminals can transmit successively their signals SRS (320/7=22), one every 2 ms. Taking into consideration transmissions of signals on two perfectly orthogonal frequency combs this increases to forty four terminals which can transmit successively their signals SRS in the period of 320 ms.

Figure 7:
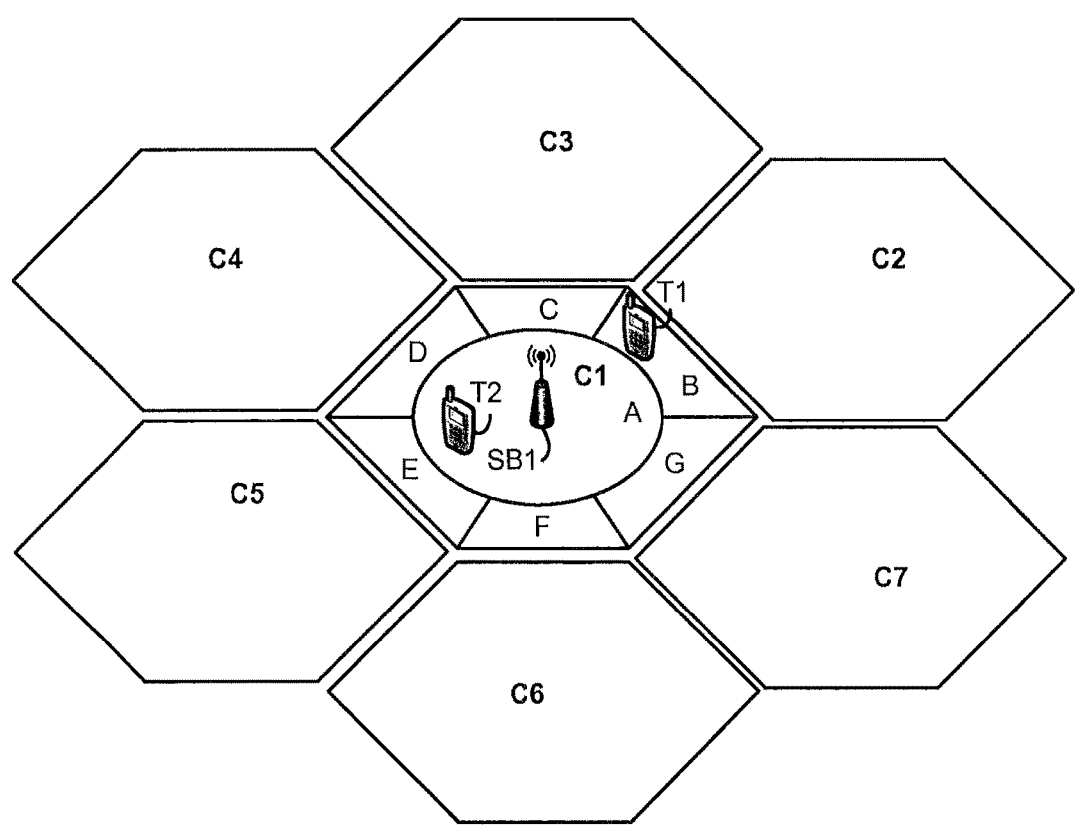
FIG. 7: a schematic representation of allocation of radio resources according to a first embodiment of the invention.

According to a first embodiment of the allocation of radio resources at step E6 of FIG. 4, each base station manages the allocation of radio resources by dividing the set of frequency blocks of the frequency band into several sub-assemblies of frequency blocks. Each sub-assembly of frequency blocks is intended for the allocation of resources for terminals as a function of their potentiality to interfere with the communications of a given adjacent cell. According to the example of FIG. 7, the cell C1 is divided into seven zones A to F, each zone corresponding to a zone of the cell in which a terminal of the cell may or not interfere with communications established in the cell adjacent to the zone. For example, the terminals present in the zones B to G are capable of interfering with the communications respectively of the adjacent cells C2 to C7 according to FIG. 1. The zone A corresponds to the zone of the cell C1 in which the terminals are not capable of interfering with the communications of the adjacent cells C2 to C7. A more or less large sub-assembly of frequency blocks, thus of radio blocks, is associated with a zone of the cell. It may also be said that a sub-assembly of radio blocks is intended for the terminals capable of interfering with a given adjacent cell. In the case of FIG. 7, each base station divides the frequency band into seven sub-assemblies of radio blocks being able to be of distinct size. The terminal T1 connected to the cell C1 and near to the cell C2, transmits a request to establish communication to the base station SB1. The base station SB1 verifies as a function of the results transmitted at step E5 by an adjacent cell, whether the terminal T1 is capable of interfering with the uplink communications established in the adjacent cell. This verification is done with the aid of information items relative to the terminal T1 which are memorised in the memories ME of SB1. If the terminal T1 interferes with the uplink communications in an adjacent cell, for example the cell C2, the base station SB1 then allocates to the terminal T1 the radio blocks comprised in the sub-assembly of radio blocks associated with zone B. The number of radio blocks allocated will be determined as a function of the identity of the terminal, the communication service demanded by the terminal as well as the availability of the radio blocks in this sub-assembly. The allocation of radio resources is carried out in an identical and synchronous manner in all of the cells of the system. Thus a sub-assembly of radio blocks associated with a first zone of a cell near to a second zone of an adjacent cell is not identical to the sub-assembly of radio blocks associated with the second zone of the adjacent cell. This makes it possible to avoid any interference of communications between nearby terminals but connected to adjacent cells since they do not communicate on the same radio blocks.

The policy for allocating radio resources relative to this first embodiment gives the opportunity to each base station to divide its population of terminals and to determine dynamically a set of terminals for which a policy for allocating radio resources must be applied. However, this embodiment of allocation is quite limited since only one sub-assembly of radio blocks is intended for the communications of terminals of a specific zone. Thus, if several terminals are located in the same zone of the cell and when no terminal is present in another zone of the cell, a sub-assembly of radio blocks may be saturated in communication whereas another sub-assembly may be entirely available.

To overcome this drawback, a second embodiment of allocation of resources consists in a more flexible allocation based on the whole frequency band while at the same time guarding against potential interferences on the uplink communications of the terminals of adjacent cells. This embodiment makes it possible to satisfy the allocation of a large number of terminals connected to the cell while avoiding any possible interference of communication with the terminals of the adjacent cells. This embodiment also makes it possible to take into consideration priorities relative to the communication services required by the terminals and priorities relative to the users of the terminals. This embodiment is based on a negotiation between the different cells of the system, more particularly between adjacent cells for exchanging radio blocks with the aim of reducing the total communication need cost of the system. This total communication need cost is determined by each base station as a function of several criteria such as for each terminal requiring an establishment of a communication to the cell: the type of user of the terminal and the type of service required per terminal and the number of resource blocks demanded by the terminal or the quantity of data to transmit.

Figure 8:
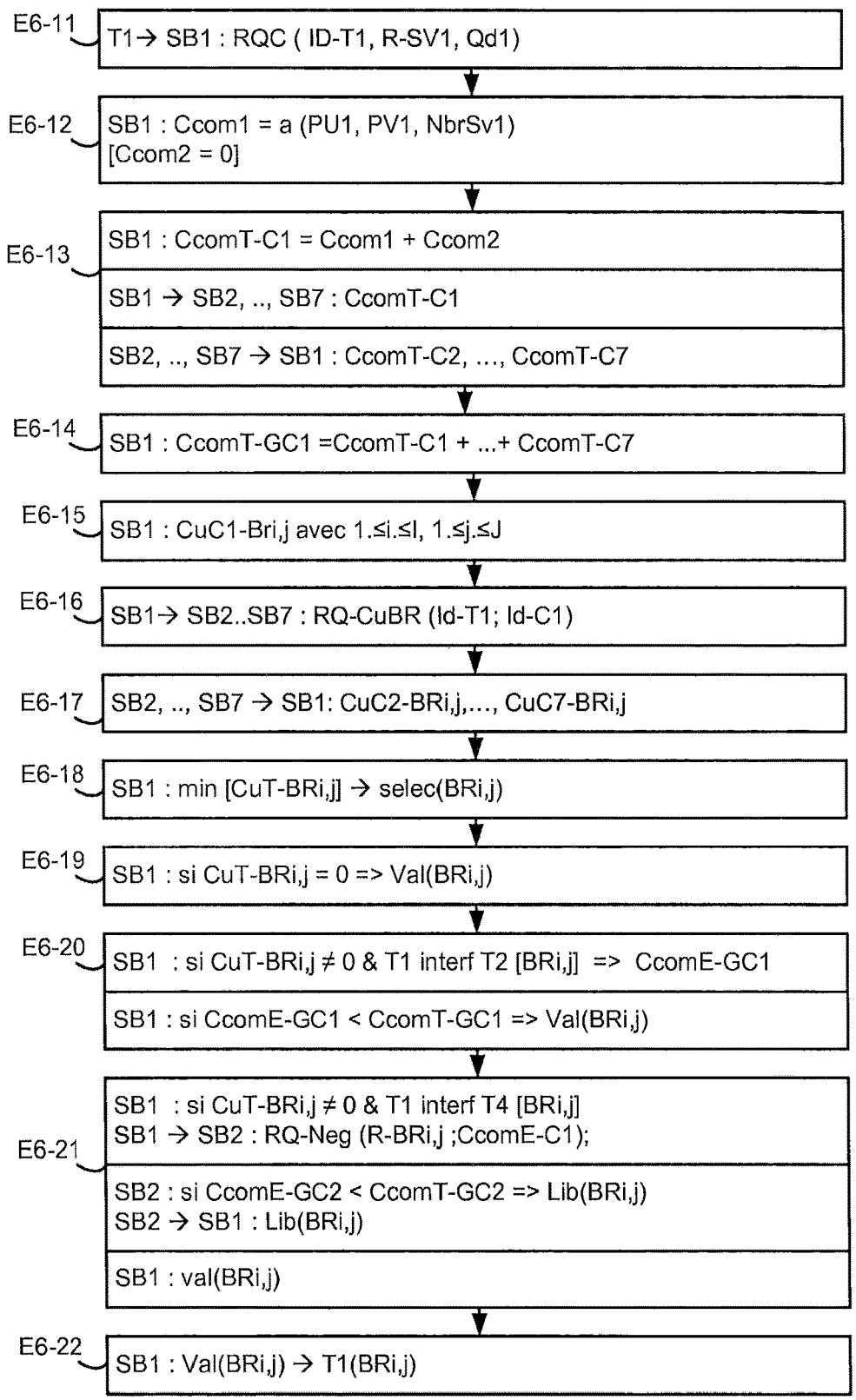
FIG. 8: a functional diagram of allocation of radio resources according to a second embodiment of the invention.

FIG. 8 represents a functional diagram of allocation of radio resources according to the second embodiment executed by the base station of the cell C1 during a demand to establish communication by the terminal T1 according to FIG. 1. All the base stations of the system according to the invention function in an identical manner on receiving one or more requests to establish a communication by the terminals of each cell. In the example, it is assumed that the base station SB1 has already established a communication for a service of the terminal T2.

At step E6-11, during its connection to the base station SB1 or when it wishes to communicate once connected, the terminal T1 transmits to the base station SB1 a request to establish communication RQC which includes among other things the identity of the terminal Id-T1 thus of its user, a reference of the communication service required R-SV1 and an information on the quantity of data to transmit Qd1. The terminal T1 can demand the establishment of several communications for different services required. To simplify the description it is considered that the terminal T1 requires a single service that will be designated SV1.

At step E6-12, on receiving the request ROC the base station SB1 determines a communication need cost Ccom1 as a function of a priority value PU1 linked to the user of the terminal T1, as a function of a priority value PV1 linked to the service required SV1 and as a function of a number of radio blocks NbrSv1 necessary for the establishment of the communication and determined from the information Qd1. The first values are associated in the memories ME of the station SB1 respectively with the identity of the terminal ID-T1 and with the reference of the service required R-SV1. For example a priority value linked to a private individual is less than a priority value linked to a security professional. Also a priority value linked to an emergency call service is greater than a priority value linked to a conventional communication service. The higher these values, the higher the communication need cost. There may be several terminals connected to the base station which require respectively and simultaneously the establishment of a communication to the base station. In this case, the base station determines for each service required by the terminals a communication need cost and firstly deals with the establishment of the communication for the service having the highest communication need cost. In the example, the communication need required by the terminal T2 is already satisfied by the base station SB1 thus its communication need cost is zero: Ccom2=0.

At step E6-13, the base station SB1 determines a total communication need cost CcomT−C1 for the cell C1 which corresponds to the sum of the communication need costs of the terminals of the cell C1. Thus the total cost CcomT−C1 is equal to the sum of the communication need cost Ccom1 and the communication need cost Ccom2. Each base station thus determines a total communication need cost and transmits this total cost to the base stations of the adjacent cells. Thus the station SB1 also receives the total communication need cost CcomT−C2, . . . , CcomT−C7 respectively of the adjacent cells C2 to C7.

At step E6-14, the base station SB1 determines a total communication need cost CcomT−GC1, for the group of cells GC1 formed of the cells C1 to C7. The total communication need cost for the group of cells CG1 corresponds to the sum of the total communication need costs of the cells of the group CG1. Similarly, each cell of the system determines a total communication need cost of a group of cells formed of the cell which determines this cost and the cells adjacent thereto.

Then at step E6-15, the base station SB1 determines for each radio block BRi,j a usage cost CuC1−Bri,j as a function of the measurements that it has established at step E3 during the transmission of the signal SRS1 from T1, at step E4 during the determination of the interference from T1 compared to each terminal of the cell C1 according to an interference threshold. If the terminal T1 is detected capable of interfering with a terminal already in communication in the cell C1, the usage cost of the radio block(s) allocated to the terminal interfered with is determined as a function of the priority value linked to the user of the terminal interfered with and as a function of the priority value linked to the service required by the terminal interfered with. All the terminals connected to the cell C1 are capable of being interfered with by T1. In the example of FIG. 1, only the terminal T2 is also connected to the cell C1 thus the usage cost of the block(s) of resources allocated to the terminal T2 are determined as a function of the priority value PU2 linked to the user of T2 and as a function of the priority value PV2 linked to the service required by the terminal T2. The radio blocks not used by the cell C1 have a zero usage cost.

Then, at step E6-16, the base station SB1 transmits to each base station of the adjacent cells C2 to C7 a usage cost request RQ−CuBR to receive the usage costs of each radio block BRi,j of the frequency band determined by each adjacent cell as a function of a possible interference of the terminal T1. The request RQ-CuBR includes the identity of the terminal T1, Id-T1 and potentially the identity of the cell C1, Id-C1. On receiving such a request each cell adjacent to C1 determines a usage cost CuC2-BRi,j, to CuC7-BRi,j for each radio block BRi,j as a function of the measurements that it has established at step E3 applied to said adjacent cell during the transmission of the signal SRS1 from T1 and at step E4 applied to said adjacent cell during the determination of the interference from T1 compared to each terminal of the adjacent cell according to an interference threshold. If the terminal T1 is detected capable of interfering with a terminal of the adjacent cell, the radio block(s) allocated for the terminal interfered with has a usage cost determined as a function of the priority value linked to the user of the terminal interfered with and the priority value linked to the service required by the terminal interfered with. This determination may be carried out by the application of an affine function on the priority parameters linked to the user and to the service. If the terminal T1 is not detected as interfering with another terminal of the adjacent cell, the blocks of resources allocated to this terminal not interfered with have a zero usage cost. Similarly the blocks not used by the adjacent cell have a zero usage cost. Thus each base station of the adjacent cells C2 to C7 transmits to the base station SB1 for each radio block BRi,j its usage cost CuC2-BRi,j to CuC7-BRi,j. Similarly, when SB1 receives such a request from one of the adjacent cells it determines the usage cost of each radio block BRi,j as a function of the possible interference from a terminal of the adjacent cell that has transmitted the request.

At step E6-17, the base station SB1 receives the usage costs of each radio block CuC2-BRi,j to CuC7-Bri,j determined by each cell adjacent to C1. The usage costs CuC1-BRi,j to CuC7-BRi,j are the results of the analysis of the interference detected from the terminal T1 on the terminals of the cells of the group GC1 transmitted at step E5 of FIG. 4. The base station SB1 determines per radio block BRi,j the total usage cost CuT-Bri,j of each block radio BRi,j which corresponds to the sum of the usage costs per radio block of the cells C1 to C7: CuT-Bri,j=CuC1-Bri,j+CuC2-Bri,j+ . . . +CuC7-Bri,j.

At step E6-18, the base station SB1 selects the radio blocks having a low total usage cost. The number of radio blocks selected is equal to the number of radio blocks NbrSv1 required by the terminal T1. The objective of the following steps E6-19 to E6-21 is to obtain a zero communication need cost Ccom1 for the terminal T1 if all the radio blocks selected and allocated are either in part not used by the cells C1 to C2, or in part used by terminals not interfered with by the terminal T1, or in part freed by adjacent cells which occupy them after negotiation between the cell C1 and said adjacent cells. The base station SB1 determines a total estimated cost of service need of the cell C1 by considering the cost of service need Csv1 of T1 is zero.

At step E6-19, if the radio blocks selected have a zero usage cost, the station SB1 is going to validate the selection of said blocks to satisfy partially or totally the request of the terminal T1.

At step E6-20, if the base station selects the radio blocks that it has already allocated to other terminals of the cell C1, it determines the estimated communication need cost CcomE-C1 of the cell C1 while taking into consideration:
- on the one hand the communication need cost Ccom1 of the terminal T1, this cost Ccom1 being determined as a function of the priority value of the user, the priority value of the service and the number of remaining radio blocks. Excluded from the remaining radio blocks are the selected radio blocks already validated (for example at step E6-19) and the selected radio blocks already allocated to other terminals of the cell C1. If there is no remaining block, then the cost Ccom1 is zero.
- on the other hand the communication need cost of the terminal that can be stripped of its radio blocks, for example T2, which is no longer a zero cost since the need of said stripped terminal is no longer satisfied.

Then, the station SB1 determines the estimated communication need cost CcomE-GC1 of the group GC1 while taking into account the estimated cost CcomE-C1 of the cell C1. If the estimated cost CcomE-GC1 is greater than the total cost CcomT-GC1 determined at step E6-14 the station SB1 does not free the selected radio blocks. In the opposite case the station SB1 frees the selected radio blocks to validate the selection of said radio blocks, in order to satisfy partially or totally the request of the terminal T1.

At step E6-21, if the base station selects radio blocks already occupied by terminals capable of being interfered with by the terminal T1 and belonging to one or more adjacent cells C2 to C7, the base station SB1 transmits a request for negotiation of radio blocks RQ-Neg to said adjacent cells. The request RQ-Neg includes a reference to the selected radio blocks R-BRi,j and the estimated communication need cost CcomE-C1 of the cell C1. The estimated cost Ccom E-C1 includes the cost Ccom1 determined as a function of the priority value of the user, the priority value of the service and the number of remaining radio blocks. Excluded from the remaining radio blocks are the selected radio blocks already validated (for example at steps E6-19 and E6-20) and the selected radio blocks already allocated to other terminals of the adjacent cell that is the recipient of the request RQ-Neg. If there is no remaining block, then the cost Ccom1 is zero. The adjacent cell that has received the request determines an estimated communication need cost for said cell if it frees the selected radio block(s) and thus strips one or more terminals that are connected to it. Then the adjacent cell determines the estimated communication need cost of the group of cells forming said adjacent cell and its own adjacent cells. If the estimated communication need cost of the group of cells is less than the total communication need cost determined, according to step E6-14 applied to said adjacent cell, and if the adjacent cell has not received a more interesting proposal from others of the cells adjacent thereto to reduce the total communication need cost of the group that it forms, it frees the radio block(s) for the cell C1. In the opposite case, the adjacent cell does not free the selected radio blocks for the cell C1. The adjacent cell notifies to the base station SB1 whether the selected blocks are freed or not. Then on receiving a positive response from the adjacent cell, the station SB1 validates the selection of the radio blocks to satisfy partially or totally the request of the terminal T1.

If the selected radio blocks cannot be available, the base station SB1 can select other radio blocks of low usage cost and reiterates the steps E6-19 to E6-21. If there are no other low cost radio blocks, the base station transmits to the terminal T1 a notification indicating to it that the communication channel established for the service required is not optimal. The terminal T1 can accept the poorly optimised communication channel or refuse the establishment of the communication channel. The steps E6-19, E6-20 and E6-21 can be executed successively or simultaneously.

At step E6-22, the base station allocates to the terminal T1 the selected and validated blocks of resources.

A simplified numerical example is given hereafter of the second embodiment of allocation with reference to the arrangement of the terminals of FIG. 1 and by considering as radio blocks of the frequency band: the radio blocks BR1,1 to BR3,2 of FIG. 3. This example does not cover all of the possible cases covered by the preceding description. This example is only indicated by way of illustration.

The following numerical values are considered in this example:
- the priority value linked to the users of terminals T1 to T6 is equal to 1: PU1=PU2=PU3=PU4=PU5=PU6=1.
- the terminal T1 requires a service of priority value equal to 1 for a radio block: PV1=1.
- the radio block BR1,1 is allocated to the terminal T2 for the establishment of a service of priority value equal to 1: PV2=1.
- the radio block BR2,1 is allocated to the terminal T3 for the establishment of a service of priority value equal to 1: PV3=1.
- the radio blocks BR3,1 and BR1,2 are allocated to the terminal T4 for the establishment of a service of priority value equal to 0.5: PV4=0.5.
- the radio blocks BR2,2 and BR3,2 are allocated to the terminal T5 for the establishment of a service of priority value equal to 1: PV5=1, and
- the radio blocks BR1,1 and BR2,1 are allocated to the terminal T6 for the establishment of a service of priority value equal to 1: PV6=1.

Initially all the demands of the terminals of the cells C1 to C2 are satisfied. Consequently initially the communication need cost of each terminal is zero, the total communication need cost of each cell C1 to C7 is zero and the total communication need cost of the group of cells C1 to C7 is also zero.

At step E6-11, the base station SB1 receives the request ROC from the terminal T1.

At step E6-12, the base station determines the communication need cost of the terminal T1: Ccom1=a(PU1, PV1, NbrSv1)=1 by considering the function has an affine type function.

At step E6-13, the station SB1 determines the total communication need cost of the cell C1: CcomT-C1=Ccom1+Ccom2=1. Since the communication need of the terminal T2 is satisfied: Ccom2=0. Each base station SB1 to SB7 thus determines respectively a total communication need cost CcomT-C1 to CcomT-C7 and transmits this total cost to the base stations of the adjacent cells.

At step E6-14, the station SB1 determines the total communication need cost of the group of cells CG1 formed of the cells C1 to C7 CcomT-GC1=CcomT-C1+CcomT-C7=1, since the costs CcomT-C2 to CcomT-C7 are zero initially.

At step E6-15, the base station SB1 determines for each radio block BRi,j a usage cost CuC1-BRi,j: CuC1-BR1,1=1; CuC1-BR1,2=0; CuC1-BR2,1=0; CuC1-BR2,2=0; CuC1-BR3,1=0 and CuC1-BR3,2=0.

At step E6-16, the base station SB1 transmits to each base station of the adjacent cells C2 to C7 a usage cost request RQ-CuBR. On receiving the request RQ-CuBR each cell C2 to C7 determines a usage cost. CuC2-BRi,j, to CuC7-BRi,j for each radio block BRi,j as a function of the interference from the terminal T1.

In the cell C2, the terminal T3 is capable of being interfered with by the terminal T1, thus the usage cost of the radio block allocated to T3 is: CuC2-BR2,1=1.

In the cell C2, the terminal T4 is capable of being interfered with by the terminal T1, thus the usage costs of the radio blocks allocated to T4 are: CuC2-BR3,1=0.5; CuC2-BR1,2=0.5.

The blocks not used by the cell C2 have zero usage costs: CuC2-BR1,1=0, CuC2-BR2,2=0 and CuC2-BR3,2=0, In the cell C3, the terminal T5 is capable of being interfered with by the terminal T1. The usage costs of the radio blocks allocated to T5 are: CuC3-BR2,2=1; CuC3-BR3,2=1.

In the cell C3, the terminal T6 is not capable of being interfered with by the terminal T1 and vice versa, thus the usage costs of the radio blocks allocated to T6 are zero: CuC3-BR1,1=0; CuC3-BR2,1=0.

The blocks not used by the cell C3 have zero usage costs: CuC3-BR1,2=0; CuC3-BR3,1=0.

The cells C4 to C7 do not have terminals according to the example of FIG. 1. Thus the usage cost of their radio block is zero.

At step E6-17, the base station SB1 receives from cells C2 and C7 the usage costs determined previously. The station SB1 determines per radio block the total usage cost of each radio block CuT-BR1,1=CuC1-BR1,1+ . . . +CuC7-BR1,1=1
CuT-BR2,1=CuC1-BR2,1+ . . . +CuC7-BR2,1=1
CuT-BR3,1=CuC1-BR3,1+ . . . +CuC7-BR3,1=0.5
CuT-BR1,2=CuC1-BR1,2+ . . . +CuC7-BR1,2=0.5
CuT-BR2,2=CuC1-BR2,2+ . . . +CuC7-BR2,2=1
CuT-BR3,2=CuC1-BR3,2+ . . . +CuC7-BR3,2=1

In the example there is no radio block having a zero total usage cost thus, at step E6-18, the base station SB1 selects one of the radio blocks having the lowest total usage cost. The station SB1 can select one of the radio blocks BR3,1, BR1,2 already allocated to the terminal T4 of the cell C2.

The blocks BR3,1 and BR1,2 not having a zero total usage cost and not being already allocated to one of the terminals of the cell C1, the base station SB1 does not execute the steps E6-19 and E6-20.

At step E6-21, the base station SB1 transmits a request for negotiation of radio blocks RQ-Neg to the cell C2. The request RQ-Neg includes references to the radio blocks BR3,1, BR1,2 and the total estimated communication need cost of the cell OI by considering the communication need of the terminal T1 satisfied if the selection is validated Ccom E-C1=0.

Figure 5:
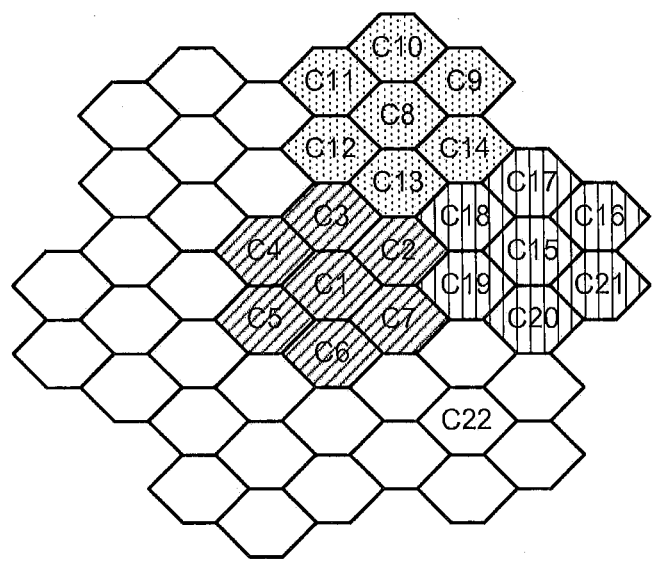
FIGS. 5 and 6: schematic representations of scheduling of measurements of signals SRS.
Figure 6:
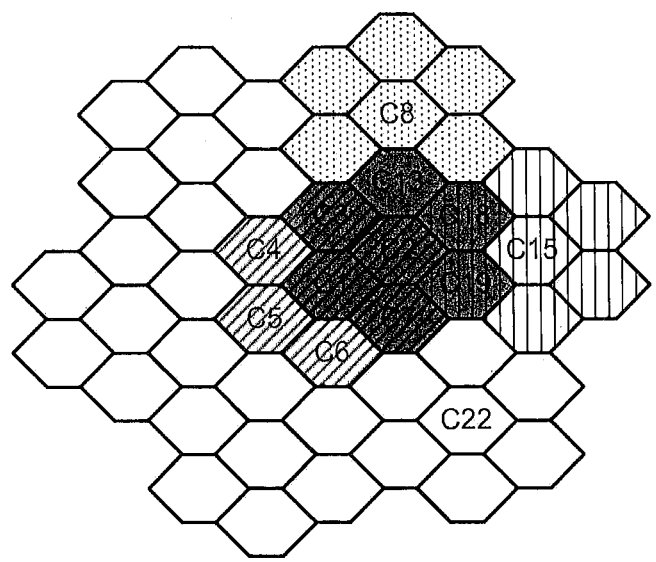

On receiving the request RQ-Neg, the base station of the cell C2 determines a total communication need cost CcomT-GC2 of the group of cells formed of the cells C2, C1, C7, C19, C13 and C3 according to FIG. 5. The determination of CcomT-GC2 is carried out at step E-14 applied to the cell C2. Thus CcomT-GC2=CcomT-C2+CcomT-C1+CcomT-C7+CcomT-C19+CcomT-C13+CcomT-C3=1, by considering initially in the cells C2, C3, C7, C19 and C13 that the communication needs are satisfied.

Then the station SB2 determines an estimated communication need cost for the group of cells GC2: CcomE-GC2 by considering that it frees one of the radio blocks BR3,1 or BR1,2. In this case the communication need cost CcommE-C1 for the cell C1 would be zero and the estimated communication need cost CcomE-C2 for the cell C2 would be equal to 0.5 which is the communication need cost of the terminal T4 if its communication need is no longer entirely satisfied. In the example, it is assumed that no other cell adjacent to the cell C2 demands a negotiation. Thus the total estimated communication need cost CcomE-GC2=0.5 is less than the total communication need cost CcomT-CG2=1 determined at step E6-14. Thus if the station SB2 frees one of the resource blocks required by the station SB1, the total communication need cost for the group GC2 will be lower.

The base station B2 frees one of the radio blocks BR3,1, BR1,2. The base station SB2 notifies to the base station SB1 that the block BR3,1, is freed. On receiving a positive response from the station SB2, the station SB1 validates the selection of the radio block BR3,1, and allocates the radio block to the terminal T1 to satisfy the request of the terminal T1, at step E6-22.

The invention claimed is:

1. A method for allocating radio resources in a wide band radio communication network for uplink communications, the network being formed of cells each comprising at least one base station and terminals, the method comprising, during a connection of a first terminal to a first base station of a first cell of a group of cells formed of the first cell and cells adjacent thereto:
performing reference signal quality measurements defined respectively for the terminals of the group of cells by each base station,
analyzing of an interference detected from the first terminal on the uplink communications of the terminals connected to the base stations of the group of cells, the analysis being carried out as a function of the reference signal quality measurements by each base station of the group of cells, and
allocating radio resources by the first base station for an uplink communication from the first terminal as a function of the analysis results on detection of interference from the first terminal on the uplink communications of the other terminals of the group of cells, the results coming from each cell of the group of cells,
wherein the method further comprises during the connection of the first terminal to the first base station:
defining first transmission rules of a first reference signal defined for the first terminal, the first transmission rules being distinct from the transmission rules of reference signals of other terminals connected to the first base station in order that the reference signals of all the terminals connected to the first base station are orthogonal to each other, and
transmitting the first transmission rules defined to the other base stations of the group of cells.

2. The method according to claim 1, wherein the analysis of the interference detected from the first terminal on another of the terminals of the group of cells includes, in each base station of the group of cells:
determining a ratio of a quality measurement of a first reference signal defined for the first terminal over the quality measurement of a reference signal defined for the other terminal connected to the base station carrying out the analysis of the interference detected,
comparing the determined ratio with an interference threshold, and
if the determined ratio is greater than the interference threshold detecting an interference from the first terminal on the other terminal.

3. A base station in a wide band radio communication network constructed and arranged to execute the steps of the method for allocating radio resources for uplink communications according to claim 1, the network being formed of cells each comprising at least one base station and terminals, the base station belonging to a first cell of a group of cells formed of the first cell and the cells adjacent thereto and including:
a unit for measuring reference signal quality defined respectively for the terminals of the group of cells,
a unit for analysing the interference detected from a first terminal on the uplink communications of other terminals connected to the base stations of the group of cells,
an interface linked to the base stations of the adjacent cells for receiving or sending the results of the analysis of the interference detected, and
a unit for allocating radio resources for the first terminal as a function of the results of the analysis of the interference detected.

4. A method for allocating radio resources in a wide band radio communication network for uplink communications, the network being formed of cells each comprising at least one base station and terminals, the method comprising, during a connection of a first terminal to a first base station of a first cell of a group of cells formed of the first cell and cells adjacent thereto:
performing reference signal quality measurements defined respectively for the terminals of the group of cells by each base station,
analyzing of an interference detected from the first terminal on the uplink communications of the terminals connected to the base stations of the group of cells, the analysis being carried out as a function of the reference signal quality measurements by each base station of the group of cells, and
allocating radio resources by the first base station for an uplink communication from the first terminal as a function of the analysis results on detection of interference from the first terminal on the uplink communications of the other terminals of the group of cells, the results coming from each cell of the group of cells,
wherein to carry out the quality measurements of reference signals from the terminals of the group of cells, each base station successively orders each terminal connected to said each base station, the transmission of a reference signal defined for said each terminal according to a first transmission time sequence, and successively receives a reference signal defined for a terminal of the group of cells according to a second reception time sequence, the transmission time sequence and the reception time sequence functioning in a simultaneous manner.

5. The method according to claim 4, wherein the transmission time sequence is applied in an identical manner to a given set of adjacent cells forming a transmission scheduling pattern of reference signal the sequence defining a successive scheduling of transmissions of reference signals, while indicating at a given instant an identity of a cell of the set in which the base station must command a transmission of a reference signal SRS to one of the terminals being connected to it.

6. The method according to claim 5, wherein the signal transmission scheduling pattern is repeated in the entire cellular network and the transmission time sequence, identical in each scheduling pattern, is applied in such a way that two base stations of adjacent cells but belonging to different sets of cells cannot order the transmission of a reference signal SRS at the same time.

7. The method according to claim 4, wherein the reception time sequence of a reference signal is specific to each cell of the network, the sequence defining a successive scheduling of receptions of reference signals transmitted respectively by the terminals of the cells of a group of cells formed by the cell scheduled by the reception time sequence and the cells adjacent to said cell, by indicating at a given instant the identity of a cell in which a terminal transmits a reference signal.

8. The method according to claim 7, wherein the reception time sequence of a cell is synchronous with at least the transmission time sequence of the cell.

9. A method for allocating radio resources in a wide band radio communication network for uplink communications, the network being formed of cells each comprising at least one base station and terminals, the method comprising, during a connection of a first terminal to a first base station of a first cell of a group of cells formed of the first cell and cells adjacent thereto:

performing reference signal quality measurements defined respectively for the terminals of the group of cells by each base station, analyzing of an interference detected from the first terminal on the uplink communications of the terminals connected to the base stations of the group of cells, the analysis being carried out as a function of the reference signal quality measurements by each base station of the group of cells, and allocating radio resources by the first base station for an uplink communication from the first terminal as a function of the analysis results on detection of interference from the first terminal on the uplink communications of the other terminals of the group of cells, the results coming from each cell of the group of cells, wherein the allocation of resources by the first base station for the first terminal includes:

receiving a request to establish a communication including an identity of the first terminal, a reference to a communication service required and an information relative to the number of resource blocks necessary to communicate, determining a total communication need cost for the group of cells formed of the first cell and the cells adjacent thereto as a function of priority values linked respectively to the identities of the terminals of the group of cells, service values linked respectively to the services required by the terminals of the group of cells, and the numbers of resource blocks required respectively by the terminals of the group of cells, determining a total usage cost of each resource block of a frequency band used by the network for all the cells of the group of cells, as a function of the priority values respectively linked to the terminals of which the uplink communications may be interfered with by the first terminal and as a function of the priority values respectively linked to the services required by the terminals of which the uplink communications can be interfered with by the first terminal, selecting a number of blocks of resources required by the first terminal, each resource block selected having a minimum total usage cost, and allocating the blocks of resources selected and validated, for the first terminal.

10. The method according to claim 9, wherein the first base station allocates the selected blocks to the first terminal if:

said blocks of resources are considered as not used by another terminal of the group of cells formed by the first cell and the cells adjacent thereto, or said blocks of resources are already used by another terminal of the group of cells and the first terminal is considered as not interfering with the other terminal, or said blocks of resources are already used by another terminal connected to the first station, and the total communication need cost for the group of cells formed of the first cell and the cells adjacent thereto is greater than an estimated communication need cost for the group of cells formed of the first cell and the cells adjacent thereto, the estimated cost being determined by considering the blocks of resources freed by the other terminal and allocated to the first terminal, or said blocks of resources are already used by another terminal connected to another base station than the first station, the first terminal being considered as interfering with the other terminal, and the total communication need cost for the group of cells formed of the cell containing the other base station and the cells adjacent thereto is greater than an estimated communication need cost for the group of cells formed of the cell containing the other base station and the cells adjacent thereto, the estimated cost being determined by the other base station by considering the blocks of resources freed by the other terminal and allocated to the first terminal.

* * * * *